United States Patent [19]

Nagasawa et al.

[11] Patent Number: 5,318,617

[45] Date of Patent: Jun. 7, 1994

[54] WRITING BOARD INK COMPOSITION

[75] Inventors: Toshiyuki Nagasawa, Yawata; Nobuyuki Murai; Kazuo Goda, both of Osaka, all of Japan

[73] Assignee: Orient Chemical Industries, Ltd., Osaka, Japan

[21] Appl. No.: 38,474

[22] Filed: Mar. 29, 1993

[30] Foreign Application Priority Data

Mar. 31, 1992 [JP] Japan .................. 4-108569

[51] Int. Cl.⁵ .............................. C09D 11/16
[52] U.S. Cl. .................. 106/19 A; 106/19 F; 106/20 A
[58] Field of Search ............... 106/19 R, 19 A, 23 H, 106/20 A, 23 B, 498

[56] References Cited

U.S. PATENT DOCUMENTS

| | | | |
|---|---|---|---|
| 4,193,906 | 3/1980 | Hatanaka | 106/23 B |
| 4,256,494 | 3/1981 | Yamamoto et al. | 106/23 B |
| 4,578,117 | 3/1986 | Nakanishi | 106/20 A |
| 4,740,549 | 4/1988 | Okuzono et al. | 106/20 A |
| 4,992,101 | 2/1991 | Jaffe et al. | 106/498 |
| 5,120,359 | 6/1992 | Uzukawa et al. | 106/20 A |
| 5,160,369 | 11/1992 | Parkinson et al. | 106/19 R |

FOREIGN PATENT DOCUMENTS 3-045662  5/1991  Japan .
2030159A  4/1980  United Kingdom .

*Primary Examiner*—Helene Klemanski
*Attorney, Agent, or Firm*—McGlew and Tuttle

[57] ABSTRACT

A writing board ink composition comprises a medium formed of a lower alcohol solvent which contains an alcohol-soluble polymer, a scraping (erasing) agent, a surfactant and a diketopyrrolopyrrole pigment having a median Stokes diameter (ultrafine particle size) of not more than 0.2 μm and represented by the following formula

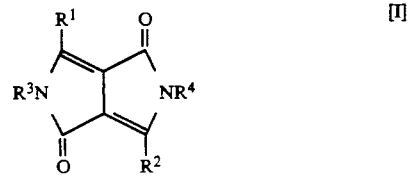

[I]

$R^1$ and $R^2$ independently represent an unsubstituted phenyl or naphthyl group of a non-water-solubilizing substituent substituted phenyl or naphthyl group, and $R^3$ and $R^4$ independently represent hydrogen or a non-water-solubilizing substituent. The writing board ink composition remains stable for a long time while in pens even when the resin content (alcohol-soluble polymer) is such that unclear writing and scrapability reduction (loss of scrapability or erasability) can be avoided, since the pigment of ultrafine particle size is fast to lower alcohol solvents.

10 Claims, No Drawings

WRITING BOARD INK COMPOSITION

BACKGROUND OF THE INVENTION

1. Field of the Invention

The present invention relates to a writing board ink composition which can be used to write on writing boards, such as the so-called whiteboard, with a marking pen, and which offers scrapable (erasable) writing.

2. Description of the Prior Art

In writing board marking inks which can be used to write on writing boards, such as the so-called whiteboard, with a marking pen, and which offer scrapable (erasable) writing, mixtures of ketone and ester solvents have traditionally been used as solvents. Also, various pigments fast to these solvents have been used to color such inks. For example, MAICROLITH RED BR-K and 4C-K of Ciba-Geigy AG, which are processed pigments prepared by dispersing a red azo pigment in a vinyl chloride-vinyl acetate copolymer resin carrier, can be used in writing board inks incorporating a mixed solvent of ketone solvent and ester solvent (Japanese Patent No. 936873).

In recent years, from the viewpoint of solvent odor and toxicity, there has been a need for the use of lower alcohol solvents. Therefore organic pigments fast to lower alcohol solvents are required. However, because conventional azo pigments are generally low in alcohol resistance when finely dispersed in lower alcohols, their use in writing board inks poses practical problems such as those in ink stability and writing erasability, since residual stain occurs upon scraping (erasing) the writing with an eraser etc. and increase in ink viscosity, pigment aggregation and other undesirable phenomena tend to occur during ink storage. Known organic pigments having excellent solvent resistance (alcohol solvent fastness), recognized as high quality pigments, include anthraquinone pigments (e.g., C. I. Pigment Red 168 and 167), condensed azo pigments (e.g., C. I. Pigment Red 144, 166 and 220), perillene pigments (e.g., C. I. Pigment Red 149, 178, 179 and 224). quinacridone pigments (e.g., C. I. Pigment Red 122, 207 and 209, and C. I. Pigment Violet 19), and thioindigo pigments (C. I. Pigment Red 38 and 88).

For these pigments to remain stable for a long time while in dispersion in an alcohol solvent in pens, they should be dispersed in the solvent in the form of ultrafine particles. However, this reduces the alcohol fastness of these pigments, which are recognized as good in alcohol fastness.

To ensure a stable dispersion system in such a state, resin is required to be used in an amount in proportion to the pigment surface area increased as the ultrafine particles are formed. However, increase in the resin content in a writing board ink incorporating a lower alcohol solvent poses problems, such as an increased occurrence of blurred writing, due to increase in ink viscosity, when the ink is used in pens, and a reduction in scrapability (erasability) in proportion to resin content.

Developed in view of the above problems in the prior art, the present invention is intended to provide a writing board ink composition incorporating a medium comprising, or based on, a lower alcohol solvent almost free of problems of odor and toxicity, wherein the pigment dispersed in the medium is fast to the above solvent despite its ultrafine size so that it remains stable for a long time while in pens even when the resin content is such that blurred writing and scrapability (erasability) reduction can be avoided.

SUMMARY OF THE INVENTION

Aiming at accomplishing the above object, the writing board ink composition of the present invention comprises a medium of, or based on, a lower alcohol solvent, wherein a diketopyrrolopyrrole pigment represented by the following formula [1] having a median Stokes diameter of not more than 0.2μm, an alcohol-soluble polymer (hereinafter also simply referred to as "polymer"), a scraping agent and a surfactant are contained;

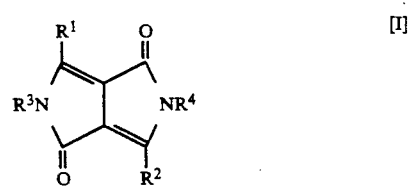

wherein $R^1$ and $R^2$ independently represent an unsubstituted or non-water-solubilizing substituent substituted phenyl group or naphthyl group; $R^3$ and $R^4$ independently represent hydrogen or a non-water-solubilizing substituent.

The writing board ink composition of the present invention incorporates a medium of, or based on, a lower alcohol solvent almost free of problems of odor and toxicity. Since the pigment dispersed in the medium is fast to the above solvent despite its median Stokes diameter of not more than 0.2 μm, the writing board ink composition of the present invention remains stable with essentially no increase in ink viscosity or pigment aggregation for a long time while in pens even when the resin content is such that blurred writing and scrapability (erasability) reduction can be avoided, and offers good writing quality (no pen tip clogging), high color densities and brilliant colors.

DETAILED DESCRIPTION OF THE INVENTION

Non-water-solubilizing substituents for the above $R^1$ and $R^2$ include alkyl groups, halogens, cyano groups, nitro groups and alkenyl groups.

Non-water-solubilizing substituents represented by the above $R^3$ and $R^4$ include alkyl groups, halogen-substituted alkyl groups, cyano-substituted alkyl groups, phenyl groups, naphthyl groups, aralkyl groups and styryl groups.

The above-mentioned diketopyrrolopyrrole pigment is preferably a red pigment represented by formula I wherein each of $R^1$ and $R^2$ is a phenyl group selected from the group consisting of unsubstituted phenyl group, a chlorophenyl group, a bromophenyl group and a cyanophenyl group and each of $R^3$ and $R^4$ is hydrogen. In this case, the writing board ink composition has a red color.

Diketopyrrolopyrrole pigments used in the ink composition of the present invention are commercially available under trade names such as IRGAZIN DPP RED BO and CROMOPHTAL DPP RED BP (both produced by Ciba-Geigy). Although such commercial pigment products have an average particle size of about 1 to 2 μm, they can be prepared as ultrafine powder particles having an average particle size of at least about 1/5 to 1/10 of the average grain size of the primary particles. Diketopyrrolopyrrole pigments are fast to lower alcohol solvents even when their median Stokes diameter is not more than 0.2 μm, and ink compositions prepared by dispersing this type of pigment in a medium of, or based on, a lower alcohol solvent, remain stable with essentially no increase in viscosity or pigment aggregation for a long time while in pens even when the resin content is such that adhesion to the writing board and pigment dispersion stability can be maintained and blurred writing and scrapability (erasability) reduction can be avoided, and offer good writing quality free of pen tip clogging. In addition, they offer high color densities and brilliant colors. The median Stokes diameter of the diketopyrrolopyrrole pigment in the present invention preferably ranges from 0.1 to 0.15 μm. If this value is under 0.1 μm, the surface area of the dispersed pigment is so great that more resin is required to ensure a stable dispersion system, and the ink viscosity can be inappropriate for writing.

In the writing board ink composition of the present invention, the diketopyrrolopyrrole pigment described above is used in amounts of normally about 1 to 10% by weight, preferably about 2 to 5% by weight of the total amount of ink. If this content is under 1% by weight, it is highly possible that the ink fails to offer a satisfactory density for writing board ink. If this content exceeds 10% by weight, the amount of resin required to ensure a stable pigment dispersion increases above the appropriate range for writing board ink, which can result in excess ink viscosity and make writing impossible.

The medium for the ink composition of the present invention may be a monohydric lower alcohol such as methanol, ethanol, n-propanol, isopropanol or a mixture of two or more thereof, or may be based thereon.

Since the exclusive use of a highly volatile monohydric lower alcohol solvent such as methanol, ethanol, n-propanol or isopropanol often results in figure whitening or blurred writing due to ink drying in the tip of marking pen etc., it is preferable to add to the medium an alcohol solvent having 4 or more carbon atoms, an ethylene glycol monoalkyl ether solvent, glycol solvent or sucrose ester as an anti-whitening agent or drying suppressor. As a drying suppressor, it is preferable to add the sucrose ester described in Japanese Patent Publication Open to Public Inspection Nos. 84369/1985 and 34080/1986. For the same purpose, an aromatic organic solvent may be added.

When the ink composition of the present invention contains one or more solvents as a medium selected from the group consisting of methanol, ethanol, n-propanol and isopropanol, and an anti-whitening agent or drying suppressor selected from the group consisting of alcohol solvents having 4 or more carbon atoms, ethylene glycol monoalkyl ether solvents, glycol solvents and sucrose esters, ink drying in the pen tip, blurred writing and figure whitening can be effectively prevented while using a highly volatile monohydric lower alcohol solvent such as methanol, ethanol, n-propanol or isopropanol.

Any polymer can be used in the ink composition of the present invention, as long as it provides the ink with film forming capability, adhesion on the writing board surface and pigment dispersion stability and it is soluble in the lower alcohol solvent used.

Usable polymers include polyvinyl butyral, polyvinyl pyrrolidone, vinyl acetate resin, polyacrylates (polyester acrylate), shellac and ethyl cellulose. These polymers may be used singly or in combination. The amount of these polymers used is normally about 1 to 20% by weight, preferably about 2 to 10% by weight of the total amount of ink composition. To ensure a low ink viscosity, it is preferable to use a polymer having a relatively low degree of polymerization.

The polymer particularly suitable for the ink of the present invention is the polyvinyl butyral terpolymer consisting of a polyvinyl acetal moiety, a polyvinyl alcohol moiety and a polyvinyl acetate moiety. This terpolymer contains butyral groups, hydroxyl groups and acetyl groups in an appropriate ratio. Thus the use of a small amount of this terpolymer offers excellent pigment dispersion stability for a long time and makes it possible to keep the ink composition of the present invention stable for a long time. Actually, good results were obtained by use of some commercial products, namely S-LEC BM-S (trade name for a polyvinyl butyral product) of Sekisui Chemical Co., Ltd. and DENKA BUTYRAL #4000-1 (trade name for a polyvinyl butyral product) of Denki Kagaku Kogyo K. K.

The scraping agent is an additive used to scrape (erase) undesirable letters and other writings, drawn on the writing board with the ink composition of the present invention, from the writing board. This scraping agent surrounds particles separating upon drying of the polymer and pigment and makes it possible to erase the written letters. Since complete compatibility of the scraping agent with the polymer results in residual stain after scraping (erasing) the writing, and since complete incompatibility results in hard writing on the writing board, which writing becomes increasingly difficult to scrape with the lapse of time, it is preferable to use a scraping agent appropriately compatible with the polymer used.

The amount of scraping agent used is normally about 50 to 150% by weight of the total amount of pigment and polymer. Scraping agent contents of less than 50% by weight result in an increase in the possibility of failure to obtain good scrapability. Scraping agent contents exceeding 150% by weight result in an increase in the possibility of density reduction due to failure to form a uniform writing film upon ink drying.

The scraping agent may be a nonvolatile or hardly (scarcely) volatile substance soluble in the lower alcohol solvent used and liquid at not lower than −5° C. Such scraping agents include esters of higher fatty acid (e.g., myristyl caproate, isostearyl caproate, oleyl caproate, isostearyl caprylate, oleyl caprylate, cetyl 2-ethylhexanoate, stearyl 2-ethylhexanoate, isostearyl 2-ethylhexanoate, oleyl 2-ethylhexanoate, isooctadecyl caprate, oleyl caprate, isooctyl palmitate, isooctadecyl palmitate, isooctyl stearate, isooctadecyl stearate, isopropyl myristate, lauryl oleate and butyl oleate), glycols (e.g., ethylene glycol, diethylene glycol, propylene glycol, 2,5-hexanediol, and liquid polyethylene glycol and polypropylene glycol), and higher alkyl ethers (e.g., monooctyl ether and monolauryl ether) of ethylene glycol or diethylene glycol. These scraping agents may be used singly or in combination as appropriate.

In the writing board ink composition of the present invention, the surfactant is added as a pigment dispersion and scraping aid.

Writing erasability is often unsatisfactory with the scraping agent alone. It is therefore necessary to add a surfactant to make the pigment/polymer particles separating upon post-writing solvent volatilization dispersed in the form of appropriate-sized particles permitting easy scraping. If this particle size is too large, writing density decreases, though erasing is easy. If this particle size is insufficient, erasing is difficult, though writing density is high. The preferable particle size range is from 2 to 4 μm.

Any surfactant can be used, as long as it is soluble in the lower alcohol solvent used and it is capable of making the scraping agent to surround the pigment and polymer particles upon drying the writing and providing an appropriate size for the particles to facilitate the formation of a uniform writing film. It is no matter whether the surfactant is nonionic, anionic or cationic. The amount of surfactant used is normally about 1 to 5% by weight of the total amount of ink.

Surfactants which can be used are exemplified as follows:

Nonionic surfactants include polyoxyethylene alkyl ethers, fatty acid esters of polyoxyethylene, fatty acid esters of sorbitan, fatty acid esters of polyethylene glycol and fatty acid esters of glycerol.

Anionic surfactants include polyoxyethylene alkyl sulfates, alkyl sulfates, alkylphosphates and alkylnaphthalenesulfonates.

Cationic surfactants include alkylamine salts and quaternary ammonium salts.

The writing board ink composition of the present invention can, for example, be produced by the following four process steps:

Process Step 1: Polymer is dissolved in lower alcohol to yield a polymer solution.

Process Step 2: A diketopyrrolopyrrole pigment is added to the polymer solution obtained in process steps 1, to yield a premix base.

Process Step 3: The premix base obtained in process steps 2 is ultrafinely dispersed using a mill so that the median Stokes diameter of the diketopyrrolopyrrole pigment is not more than 0.2 μm.

The mill base obtained has fluidity and remains stable with essentially no increase in ink viscosity or pigment aggregation even in long-term storage.

Process Step 4: A scraping agent and a surfactant are added to the mill base obtained in process steps 3, and the lower alcohol used in process steps 1 is added to adjust ink viscosity.

The ink thus obtained has a high color density, permitting brilliant writing on writing boards, and the writing is scrapable (erasable) by gently rubbing it with an eraser even after a long period.

EXAMPLES

The present invention is hereinafter described in more detail by means of the following examples, but these are not to be construed as limitative on the present invention. In the description below, "part(s) by weight" are referred to as "part(s)" for short.

EXAMPLE 1

10 parts of polyvinyl butyral (trade name: DENKA BUTYRAL #40000-1, produced by Denki Kagaku Kogyo K. K.) were dissolved in 75 parts of a denatured ethyl alcohol solvent (trade name: SOLMIX AP-1, produced by Nippon Kaseihin Co., Ltd.). To this polymer solution, 15 parts of a diketopyrrolopyrrole pigment (trade name CROMOPHTAL DPP RED BP, produced by Ciba-Geigy AG) were added, followed by 2 hours of stirring using a dissolver, to yield a premix base.

This premix base was circulatorily dispersed for 15 hours using a horizontal wet disperser filled with zirconia beads to yield a fluid mill base (600 cP[centipoise]/25° C.).

To 8 parts of this mill base, 34.5 parts of SOLMIX AP-1, 1 part of ethylene glycol monobutyl ether, 5 parts of a scraping agent (octyl palmitate) (trade name: UNISTAR MB-816, produced by Nippon Oil & Fats Co., Ltd.) and 1.5 parts of a surfactant (trade name: PRYSURF A212E, produced by Dai-ichi Kogyo Seiyaku Co., Ltd.) were added, followed by stirring for 2 hours, to yield a red ink having a viscosity of 8 cP/25° C.

The obtained mill base and ink remained stable in long-term storage. A writing test using this ink filled in a writing board marking pen showed that brilliant writing can be obtained on the writing board with no pen tip ink clogging or writing density reduction, and the writing could easily be erased with an eraser even after a long period.

Table 1 shows mill base properties (dispersion state, pigment particle size in median Stokes diameter and storage stability), ink color, ink stability and writing scrapability.

For pigment particle size, the Stokes diameter of pigment particles was determined by the centrifugal method using a centrifugal particle size tester (trade name: CAPA700, produced by Horiba, Ltd.). Measuring samples were prepared by adding one drop of the above mill base to about 10 ml of ethanol, followed by sonication for 15 seconds, and adding an appropriate amount of ethanol (about 50 to 70 ml), followed by sonication for 15 seconds. For tester settings, ethanol density and viscosity were set at levels corresponding to the temperature higher by 3° C. than room temperature, with a pigment density of 1.55 g/cm$^3$. The tester rotation rate was 5000 rpm. Measurements were made for each of 0.1 μm sections between a distance of 0.1 to 1 μm, and results were expressed in percent ratio of particles in each section and the median value calculated therefrom.

The percent particle number ratio is shown below. The median was 0.12 μm, as shown in Table 1.

>1.0 μm:0.0%
1.0–0.9 μm:0.0%
0.9–0.8 μm:0.0%
0.8–0.7 μm:0.0%
0.7–0.6 μm:1.5%
0.6–0.5 μm:5.5%
0.5–0.4 μm:9.0%
0.4–0.3 μm:4.6%
0.3–0.2 μm:13.0%
0.2–0.1 μm:21.8%
0.1–0.0 μm:44.6%

EXAMPLE 2

15 parts of polyvinyl butyral (trade name: S-LEC BM-S, produced by Sekisui Chemical Co., Ltd.) were dissolved in 70 parts of a denatured ethyl alcohol solvent (trade name: SOLMIX AP-2, produced by Nippon Kaseihin Co., Ltd.). To this polymer solution, 15 parts of a diketopyrrolopyrrole pigment (trade name: IRGAZIN DPP RED BO, produced by Ciba-Geigy AG) were added, followed by 2 hours of stirring using a dissolver, to yield a premix base.

This premix base was circulatorily dispersed for 20 hours using a horizontal wet disperser packed with zirconia beads to yield a fluid mill base (500 cP [centipoise]/25° C.).

To 10 parts of this mill base, 34 parts of SOLMIX AP-2, 5 parts of a scraping agent (isopropyl myristate) (trade name: IPM-EX, produced by Nikko Chemicals Co., Ltd.) and 1 part of a surfactant (trade name: HITENOL No. 8, produced by Dai-ichi Kogyo Seiyaku Co., Ltd.) were added, followed by stirring for 2 hours, to yield a red ink having a viscosity of 8 cP/25° C.

The obtained mill base and ink remained stable in long-term storage. A writing test using this ink filled in a writing board marking pen showed that brilliant writing can be obtained on the writing board with no pen tip ink clogging or writing density reduction, and the writing could easily be erased with an eraser even after a long period.

Table 1 shows mill base properties (dispersion state, pigment particle size in median Stokes diameter and storage stability), ink color, ink stability and writing scrapability.

Pigment particle size was determined in the same manner as in Example 1.

EXAMPLE 3

A fluid mill base (500 cP/25° C.) was prepared in the same manner as in Example 1 except that premix base circulatory dispersing time was 10 hours.

To 8 parts of this mill base, 34.5 parts of SOLMIX AP-1, 1 part of ethylene glycol monobutyl ether, 0.5 parts of a drying suppressor (sucrose ester) (trade name: D K ESTER F 140, produced by Dai-ichi Kogyo Seiyaku Co., Ltd.), 5 parts of a scraping agent (octyl palmitate) (trade name: UNISTAR MB-816, produced by Nippon Oil & Fats Co., Ltd.) and 1.5 parts of a surfactant (trade name: PRYSURF A212E, produced by Dai-ichi Kogyo Seiyaku Co., Ltd.) were added, followed by stirring for 2 hours, to yield a red ink having a viscosity of 8 cP/25° C.

Table 1 shows mill base properties (dispersion state, pigment particle size in median Stokes diameter and storage stability), ink color, ink stability and writing scrapability.

Pigment particle size was determined in the same manner as in Example 1.

TABLE 1

|  | Example 1 | Example 2 | Examle 3 |
| --- | --- | --- | --- |
| Dispersion state | Initial viscosity was about 300 cP/25 °C. Although viscosity increased gradually to 600 cP/25 °C. as dispersion proceeded, fluidity was retained. | Initial viscosity was about 500 cP/25 °C. Fluidity was retained with no increase in ink viscosity even when dispersion proceeded. | Initial viscosity was about 300 cP/25 °C. Although viscosity increased gradually to 500 cP/25 °C. as dispersion proceeded, fluidity was retained. |
| Pigment particle size | 0.12 μm (median) | 0.15 μm (median) | 0.18 μm (median) |
| Storage stability | Almost no increase in viscosity, with stable dispersion particle size. | Almost no increase in viscosity, with stable dispersion particle size. | Almost no increase in viscosity, with stable dispersion particle size. |
| Ink color | Brilliant red | Brilliant red | Brilliant red |
| Ink stability | Stable with almost no change in viscosity or dispersed pigment aggregation even in long-term storage. | Stable with almost no change in viscosity or dispersed pigment aggregation even in long-term storage. | Stable with almost no change in viscosity or dispersed pigment aggregation even in long-term storage. |
| Scrapability | Good | Good | Good |

COMPARATIVE EXAMPLES 1 THROUGH 5

To confirm the effect of the ink of the present invention, comparative ink sample Nos. 1 through 5 were prepared and evaluated in the same manner as in Example 2 except that the diketopyrrolopyrrole pigment used in Example 2 was replaced with the pigments listed in Table 2.

TABLE 2

|  | Comparative Example 1 | Comparative Example 2 | Comparative Example 3 | Comparative Example 4 | Comparative Example 5 |
| --- | --- | --- | --- | --- | --- |
| Pigment C.I. No. | RED 53:3 | RED 144 | RED 177 | RED 248 | RED 224 |
| Structure | Azo (lake) | Condensed azo | Anthraquinone | Condensed azo | Perillene |
| Dispersion state | Increase in viscosity | Increase in viscosity | Increase in viscosity | Increase in viscosity | Increase in viscosity |
| Pigment particle size | Not less than 0.2 μm | 0.15 μm | 0.12 μm | 0.18 μm | 0.20 μm |
| Storage stability | Increase in viscosity, aggregation (gelation) | Increase in viscosity, aggregation | Increase in viscosity, aggregation (gelation) | Increase in viscosity, aggregation | Increase in viscosity, aggregation |
| Ink color | Yellowish red | Yellowish red with turbidity | Bluish red with turbidity | Good | Bluish red with turbidity |
| Ink stability | Increase in viscosity, aggregation | Increase in viscosity, aggregation | Increase in viscosity, aggregation | Increase in viscosity, aggregation | Increase in viscosity, aggregation |
| Scrapability | Residual | Good | Good | Residual | Good |

TABLE 2-continued

| | Comparative Example 1 | Comparative Example 2 | Comparative Example 3 | Comparative Example 4 | Comparative Example 5 |
|---|---|---|---|---|---|
| | stain | | | stain | |

In all of the above examples, the dissolver used to form the premix base was a conventional mixing apparatus, and in determining the pigment particle size, the sonication was effected by a conventional ultrasonic vibrator apparatus.

As to the diketopyrrolopyrrole pigment of formula I above, in general, $R^1$ and $R^2$ each independently represents a phenyl or naphthyl group which is optionally substituted with at least one non-water-solubilizing substituent such as alkyl, especially lower alkyl having 1 to 4 carbon atoms (e.g. methyl), halogen (e.g. chloro and bromo), cyano, nitro and alkenyl, especially lower alkenyl having 1 to 4 carbon atoms (e.g. vinyl), while $R^3$ and $R^4$ each independently represents hydrogen or a non-water-solubilizing substituent such as alkyl, especially lower alkyl having 1 to 4 carbon atoms (e.g. methyl), halogen-substituted alkyl (e.g. chloroalkyl and bromoalkyl), especially halogen-substituted lower alkyl having 1 to 4 carbon atoms, cyano-substituted alkyl, especially cyano-substituted lower alkyl having 1 to 4 carbon atoms, phenyl, naphthyl, aralkyl (e.g. benzyl) and styryl.

The non-water-solubilizing substituents contemplated are generally hydrophobic groups which inhibit dissolution of the pigment in water or water based (aqueous) solvents, and thus preserve written images, etc. on a writing board produced from the ink composition of the invention.

The scraping agent serves as an erasing aid and preferably is a nonvolatile or hardly volatile (low volatility) organic substance which is soluble in the lower alcohol solvent and liquid at not lower than $-5°$ C. The scraping agent is capable of surrounding the individual ultrafine pigment particles upon drying of the alcohol-soluble polymer (defining the resin content of the ink composition and providing the film forming component thereof) and pigment, to permit scraping (erasing) thereof from a writing board, e.g. by a conventional stationary eraser of the type used to erase marking pen ink from a writing board. In particular, the scraping agent includes esters of higher fatty acids (e.g. having at least 6 carbon atoms in the fatty acid moiety), glycols, higher alkyl ethers of ethylene glycol or of diethylene glycol (e.g. having at least 8 carbon atoms in the alkyl ether moiety), and mixtures of the foregoing.

The medium of the ink composition is preferably a lower alcohol having 1 to 3 carbon atoms such as a lower alkanol, and particularly a monohydric alkanol having 1 to 3 carbon atoms, optionally containing an anti-whitening agent or drying suppressor such as an alcohol solvent having at least 4 carbon atoms (e.g. n-butanol), an ethylene glycol monoalkyl ether solvent, a glycol solvent, a sucrose ester or an aromatic organic solvent. The alcohol solvent having at least 4 carbon atoms, ethylene glycol monoalkyl ether solvent (e.g. ethylene glycol monobutyl ether) or glycol solvent serves as an anti-whitening agent, while the sucrose ester or aromatic organic solvent serves as a drying suppressor.

What is claimed is:

1. Writing board ink composition comprising a medium formed of a lower alcohol solvent, said medium containing an alcohol-soluble polymer, a scraping agent, a surfactant and ultrafine particles of a diketopyrrolopyrrole pigment having a median Stokes diameter of not more than 0.2 μm and represented by the formula

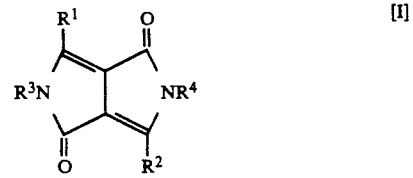

in which $R^1$ and $R^2$ independently represent an unsubstituted phenyl or naphthyl group or a phenyl or naphthyl group which is substituted with at least one non-water-solubilizing substituent, and R3 and $R^4$ independently represent hydrogen or a non-water-solubilizing substituent, wherein the pigment is present in an amount of about 1 to 10% by weight of the total ink composition, the alcohol-soluble polymer is present in an amount of about 1 to 20% by weight of the total ink composition, the scraping agent is present in an amount of about 50 to 150% by weight of the total amount of the pigment and alcohol-soluble polymer present in the ink composition, and the surfactant is present in an amount of about 1 to 5% by weight of the total ink composition.

2. Composition of claim 1 wherein $R^1$ and $R^2$ independently represent an unsubstituted phenyl group, an unsubstituted naphthyl group or a non-water-solubilizing substituent substituted phenyl or naphthyl group in which the non-water-solubilizing substituent is selected from the group consisting of alkyl, halogen, cyano, nitro and alkenyl, and $R^1$ and $R^4$ independently represent hydrogen or a non-water-solubilizing substituent selected from the group consisting of alkyl, halogen substituted alkyl, cyano substituted alkyl, phenyl, naphthyl, aralkyl and styryl.

3. Composition of claim 1 wherein $R^1$ and $R^2$ independently represent phenyl, chlorophenyl, bromophenyl or cyanophenyl, and $R^3$ and $R^4$ independently represent hydrogen.

4. Composition of claim 1 wherein the pigment has a median Stokes diameter of about 0.1 to 0.15 μm.

5. Composition of claim 1 wherein the alcohol-soluble polymer comprises at least one polymer selected from the group consisting of polyvinyl butyral, polyvinyl pyrrolidone, vinyl acetate resin, polyester acrylate, shellac and ethyl cellulose.

6. Composition of claim 1 wherein the alcohol-soluble polymer comprises a polyvinyl butyral terpolymer having a polyvinyl acetal moiety, a polyvinyl alcohol moiety and a polyvinyl acetate moiety.

7. Composition of claim 1 wherein the scraping agent comprises a nonvolatile or hardly volatile organic substance which is soluble in the lower alcohol solvent and liquid at not lower than $-5°$ C.

8. Composition of claim 1 wherein the scraping agent comprises a nonvolatile or hardly volatile organic substance which is soluble in the lower alcohol solvent and liquid at not lower than −5° C., which is capable of surrounding the pigment particles upon drying of the alcohol-soluble polymer and pigment of the ink composition to permit scraping thereof from a writing board, and which is selected from the group consisting of esters of higher fatty acids, glycols, higher alkyl ethers of ethylene glycol or of diethylene glycol, and mixtures thereof.

9. Composition of claim 1 wherein the medium is formed of at one lower alcohol solvent selected from the group consisting of methanol, ethanol, n-propanol and isopropanol, and contains a member selected from the group consisting of alcohol solvents having at least 4 carbon atoms, ethylene glycol monoalkyl ether solvents, glycol solvents and sucrose esters, as an antiwhitening agent or drying suppressor.

10. Writing board ink composition comprising a medium formed of a lower alcohol solvent, said medium containing an alcohol-soluble polymer, a scraping agent, a surfactant and ultrafine particles of a diketopyrrolopyrrole pigment having a median Stokes diameter of not more than 0.2 μm and represented by the formula

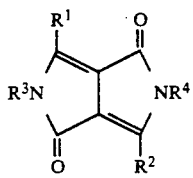

[I]

in which $R^1$ and $R^2$ independently represent an unsubstituted phenyl group, an unsubstituted naphthyl group or a non-water-solubilizing substituent substituted phenyl or naphthyl group in which the non-water-solubilizing substituent is selected from the group consisting of alkyl, halogen, cyano, nitro and alkenyl, and $R^3$ and $R^4$ independently represent hydrogen or a non-water-solubilizing substituent selected from the group consisting of alkyl, halogen substituted alkyl, cyano substituted alkyl, phenyl, naphthyl, aralkyl and styryl, the pigment being present in an amount of about 1 to 10% by weight of the total ink composition, the alcohol-soluble polymer comprising at least one polymer selected from the group consisting of polyvinyl butyral, polyvinyl pyrrolidone, vinyl acetate resin, polyester acrylate, shellac and ethyl cellulose, and being present in an amount of 1 to 20% by weight of the total ink composition, the scraping agent comprising a nonvolatile or hardly volatile substance which is soluble in the lower alcohol solvent and liquid at not lower than −5° C., which is capable of surrounding the pigment particles upon drying of the alcohol-soluble polymer and pigment of the ink composition to permit scraping thereof from a writing board, and which is selected from the group consisting of esters of higher fatty acids, glycols, higher alkyl ethers of ethylene glycol or of diethylene glycol, and mixtures thereof, the scraping agent being present in an amount of about 50 to 150% by weight of the total amount of the pigment and alcohol-soluble polymer present in the ink composition, and the surfactant being present in an amount of about 1 to 5% by weight of the total ink composition.

* * * * *